United States Patent Office 2,815,355
Patented Dec. 3, 1957

2,815,355

METHOD FOR PREPARING CARBOXYLIC ACIDS

Robert H. Hill, St. Albans, W. Va., assignor to Standard Oil Company, Chicago, Ill., a corporation of Indiana No Drawing. Application July 7, 1954,
Serial No. 441,937

3 Claims. (Cl. 260—406)

This invention relates to the preparation of carboxylic acids from crude aldehyde compositions. More particularly, it relates to an improved method for treating olefin-containing aldehyde mixtures obtained by the reaction of olefins with carbon monoxide and hydrogen in the Oxo process, and for the preparation of saturated aliphatic monocarboxylic acids therefrom in high conversions and yields.

In the Oxo process, an organic compound containing at least one olefinic or acetylenic linkage is formylated by reaction in the presence of a cobalt catalyst at a temperature between about 100 and 300° C. and a pressure between about 50 and 300 atmospheres or higher with a mixture of carbon monoxide and hydrogen having a molar ratio between about 2:1 and about 0.5:1. A crude product is obtained thereby, consisting essentially of unreacted charging stock, aldehydes derived therefrom, and ordinarily a small proportion of the corresponding alcohols, together with cobalt carbonyls and high-boiling organic by-products. The conversion of a simple charging stock (wherein R represents an organic radical) is represented by the following equation:

and

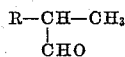

The aldehydes resulting from the illustrated reaction are commonly converted, at least in small part, to the corresponding alcohols during the formylation reaction. The crude aldehyde mixture obtained from the Oxo process may be subjected to further conversion in a variety of ways, such as by hydrogenation to prepare the corresponding alcohols, by oxidation to convert the aldehydes into carboxylic acids, by reductive amonolysis in the presence of a hydrogenation catalyst to produce the corresponding amines, or by other reactions known in the art.

The present invention relates to the oxidation of Oxo aldehydes to the corresponding carboxylic acids by treatment with oxygen, by air-blowing, or the like. Specifically, I have found that the unreacted olefins in Oxo formylation products should be removed prior to such an oxidation treatment, since these olefins appear to have a strong inhibiting effect on the oxidation of the aldehydes. After the aldehydes have been purified in this way, they are not only oxidized more rapidly and completely, but are converted into carboxylic acids of improved color and odor and in higher yields.

One object of my invention is to prepare carboxylic acids. Another object is to improve the oxidation of aldehydes. Another object is to remove oxidation inhibitors from Oxo-process aldehydes and to convert the resulting purified aldehydes into carboxylic acids. Another object is to improve the rate and extent of oxidation of Oxo-process aldehydes and to improve the yield and quality of carboxylic acids obtained therefrom. These and other objects of my invention will be apparent from the following description thereof.

The problem toward which my invention is directed is obscure in principle, and was encountered quite unexpectedly. The presence of unreacted olefins in the Oxo-process formylation product would not, as far as I am aware, have been expected to inhibit the oxidation of the aldehydes therein to carboxylic acids when the crude mixture was blown with air or oxygen, either with or without oxidation catalysts. It is well known that aldehydes are readily oxidized by air-blowing at temperatures in the range of 50 to 100° C., at ordinary or elevated pressures, and with or without catalysts such as lead, manganese, or cobalt salts, or the like. Under these conditions it might be expected that olefins would take up small quantities of oxygen, but not in such quantities as to compete with the aldehyde oxidation, and in fact no such competition has ever been observed. It is therefore apparent that the inhibitory action of unreacted olefins in the Oxo formylation product must involve some sort of catalytic mechanism, the nature of which has not been ascertained. This effect, I have found, is totally avoided by treating the Oxo formylation product, prior to oxidation, in any manner whereby the olefins therein are removed in fact or in effect.

A variety of ways can successfully be employed for purifying the Oxo formylation product in accordance with the requirements of my invention. The olefins can be removed, for example, by a simple fractional distillation. Stripping with inert gas can also be employed to drive off the olefins, owing to the relatively higher boiling points of the aldehydes. Steam distillation is a preferred variant of this technique. Fractional distillation at reduced pressure gives superior results by permitting the use of lower temperatures and thereby minimizing degradation of the aldehydes. The desired result can also be accomplished by selective hydrogenation of the olefins to the corresponding saturated hydrocarbons, employing catalysts such as platinum black, platinum-alumina, platinum-charcoal, or the like, or similarly prepared palladium catalysts, at temperatures from about 0 to 100° C. and pressures from atmospheric to around 500 pounds per square in gage. As another expedient, the aldehydes can be extracted from the crude formylation product by use of an aqueous bisulfite solution, and can be regenerated and recovered from the resulting extract by means well known in the art. In all cases, the aldehydes can further be purified if desired by fractional distillation, employing one of the usual techniques such as steam distillation, vacuum distillation, flash distillation, or the like. The residual olefin content should be less than 5 percent by volume in all cases, preferably less than 1 percent; and for best results the olefin content of the purified aldehydes should be less than about 0.2 percent.

In any distillation technique for purification of the Oxo formylation product, I have observed a tendency toward degradation and loss of yield of aldehydes. This effect is apparently due to the existence in the crude formylation product of acidic materials in a sufficient quantity ordinarily to lower the pH thereof to the range of about 3 to 4. This condition may be due to the presence therein of a quantity of cobalt hydrocarbonyl, derived from the formylation catalyst, or to other acidic by-products of unascertained composition. In distilling the Oxo formylation product to remove unreacted olefins and optionally to further purify the aldehydes, I prefer to employ steam distillation at a pH above about 5 in the absence of free strong base and in the presence of water and a water-soluble buffering salt derived from an acid containing at least one ionizable hydrogen atom having a dissociation constant at 25° C. smaller than about $10^{-3}$. Such added salts are believed to react with or otherwise to destroy the acidic or otherwise harmful constituents of the formylation product. In this way, the tendency of the aldehydes to polymerize, condense, undergo acetal formation, or otherwise become degraded can be overcome. The observed effect does not appear to be primarily a result of pH conditions, since at high pH levels the buffering additives give excellent results, whereas free strong bases having essentially the same pH cause extensive degradation and loss of aldehydes. It is to be understood, however, that the foregoing theories as to the modes of operation in the various steps of my process are advanced only as plausible explanations thereof, and I do not wish to be bound thereby.

My invention can be practiced in a variety of ways, of which the following is a simple embodiment.

An aqueous solution containing a buffering salt of the class defined above is introduced into a distillation vessel with a quantity of crude Oxo-process aldehydes containing unreacted olefins. The quantity of aqueous phase is not critical, but should preferably be maintained at a substantial level (for example, at least about one-fifth the volume of the organic charge stock phase) during the ensuing steam distillation. The quantity of buffering salt employed is also not critical, but should comprise at least about 1 percent by weight of the crude aldehyde phase, and should preferably constitute between about 2 and about 10 percent by weight thereof. A stoichiometric quantity of a free base or alkali such as sodium hydroxide, sodium carbonate, sodium bicarbonate, or the like, may additionally be employed to neutralize any free acidity in the crude aldehyde mixture. Steam distillation is then carried out in a conventional manner, preferably at ordinary or somewhat reduced pressure, either by introducing steam directly into the distillation charge, or by supplying heat thereto and boiling the water-containing mixture. Makeup water is added as needed, preferably at the boiling point, to maintain the water content of the distillation vessel at the desired level. The vapors from the distillation vessel are preferably led into a fractionating column of conventional design, equipped with a condenser, decanter and/or reflux drum, and suitable control apparatus. The distillate water phase may conveniently and desirably be refluxed to the top of the fractionating column, where it serves as an extractive distillation agent, improving the separation between the relatively water-soluble aldehydes and the relatively water-insoluble unreacted olefins. In such case, it is desirable to incorporate a water trap-out plate at a lower point in the fractionating column in order to avoid undesirably large accumulations of water within the system. The initial distillate fraction consists essentially of unreacted olefins, other hydrocarbons, water, and ordinarily a small proportion of aldehydes. The organic phase thereof may suitably be recycled to the Oxo process. After the olefin fraction has been withdrawn, the organic material remaining in the distillation vessel consists essentially of the Oxo-process aldehydes and higher-boiling condensation products, substantially free from olefins. This material is suitable for oxidation to the corresponding carboxylic acids without further purification. Preferably, however, the distillation is continued, and the aldehydes are withdrawn as a distillate fraction, the distillate water fraction being simultaneously refluxed or withdrawn as desired. After the aldehydes have been taken off, the residue remaining in the distillation vessel is a mixture of water, the salt employed as a treating agent, and a high-boiling organic fraction from the charging stock ("Oxo bottoms"), containing the high-boiling impurities originally present therein. The aqueous salt phase may be withdrawn and recycled, if desired, to the distillation of another batch of formylation product, after appropriate adjustment of pH and addition of makeup salt or water as required.

The substantially olefin-free aldehyde is thereafter subjected to oxidation by contacting it in the liquid phase with air or other oxygen-containing gas in the presence or absence of an oxidation catalyst. The oxidation is carried out at an elevated temperature between about 50 and 100° C. and at ordinary or elevated pressure, preferably between about 60 and 80° C. and about 1 to 10 atmospheres. Catalysts, if employed, may be salts of cobalt, lead, manganese, or the like, preferably salts which are soluble in the aldehyde, such as naphthenates, octanoates, nonanoates, tridecanoates, stearates, tallates, or the like, employed in concentrations up to around 5 percent by weight of the aldehyde, preferably around 0.1 to 2 percent. The catalyst may be suspended in the oxidation mixture, but is preferably dissolved therein. The oxidation itself can be carried out according to any of the various techniques described in the art. From about 2 to 24 hours are ordinarily sufficient to effect complete oxidation. The resulting acids are conveniently separated and purified by fractional distillation under reduced pressure.

In another aspect of my invention, the crude Oxo aldehyde charging stock is subjected to a preliminary flash-distillation from a large body of aqueous buffering-salt solution, as defined above, in a distillation vessel. The charging stock is preferably introduced therein at such a rate as to prevent the accumulation within the distillation zone of the components of the charging stock that are steam-distillable under the conditions employed. This technique has the advantages that the olefins and aldehydes are separated almost instantaneously from any impurities that might cause them to become degraded, and they are exposed for the absolute minimum of time to elevated temperatures at which they tend to undergo undesirable side-reactions. Furthermore, the distillate, being free from acids and other impurities, can be fractionally redistilled to separate the olefins from the aldehydes, preferably in the presence of an aqueous buffering-salt solution, without undergoing degradation. Alternatively, in the flash-distillation itself, it is possible to fractionally distill the vapor stream and to withdraw an aldehyde-rich side stream which can readily be stripped free from olefins.

In the buffered steam distillation of crude olefin formylation product according to the technique described above, I employ an aqueous solution having a pH above about 5, ordinarily between about 5 and 9, and preferably between about 6 and 8, of a water-soluble salt derived from an acid containing at least one ionizable hydrogen atom having a dissociation constant at 25° C. smaller than $10^{-3}$. So far as I have been able to determine, substantially any pH above about 5 is operative in this process, but the distillation must be carried out substantially in the absence of free strong bases, such as sodium hydroxide, potassium hydroxide, tetramethylammonium hydroxide, and the like. The cation constituent of the salt is unimportant, so long as the salt is substantially water-soluble. Suitable salts include the borates, bromoacetates, acetates, carbonates, chloroacetates, citrates, oxalates, phosphates, pyrophosphates, sulfites, and the like, of sodium, potassium, lithium, and (where substantially water-soluble) of calcium, magnesium, strontium, and the like.

My invention is applicable broadly to the treatment of crude Oxo-process formylation products containing unreacted olefins. Among the charging stocks that can be employed are propionaldehyde, derived from ethylene; butyraldehydes from propylene; valeraldehydes from butylenes; hexaldehydes from pentenes; margaric aldehyde from cetene; 3,5,5-trimethyl-1-hexanal from diisobutylene; octyl aldehydes from propylenebutylene interpolymers; nonyl aldehydes from n-butylene-isobutylene codimer; 3-hydroxybutyraldehyde from allyl alcohol; 3-acetoxybutyraldehyde from allyl acetate; mixed aldehydes from olefins snythesized by reacting carbon monoxide with hydrogen; and a wide variety of others, within the broad scope of the definition set forth above.

The process of my invention can be carried out batchwise, continuously, or semicontinuously, employing in each case for each step the appropriate process equipment of conventional design.

My invention will be more fully understood from the following specific examples.

*Example 1*

A C₇ propylene-butylene interpolymer was subjected to formylation under Oxo process conditions and a crude formylation product containing 53.3 weight-percent of octyl aldehydes, around 15 percent octyl alcohols, 7 percent high-boiling materials, and 25 percent unreacted olefins was obtained.

A quantity of the crude formylation product was topped by distillation under vacuum, and a distillation bottoms fraction was obtained containing 65.9 weight-percent octyl aldehydes with only a trace of olefins.

Another portion of the crude formylation product was steam-topped, and a distillation bottoms fraction was obtained containing 63.3 weight-percent of octyl aldehydes and around 1 percent of unreacted olefins.

Comparative oxidation tests were carried out on the crude formylation product and on each of the topped fractions. The oxidations were carried out by bubbling oxygen through the liquid stocks at 70° C. and an oxygen rate of 0.12 mole per mole of aldehyde per hour. The progress of the oxidation with time is set forth in the following table:

|  | Crude | Vacuum topped | Steam topped |
|---|---|---|---|
| Aldehyde content, wt.—percent | 53.3 | 65.9 | 63.3 |
| Olefin content, wt.—percent | Ca. 25 | Trace | Ca. 1 |
| Acid yield, percent of theory: |  |  |  |
| 8 hours | 10.1 | 76.6 | 51.7 |
| 12 hours | 25.1 | 81.9 | 65.2 |
| 24 hours | 45.5 | 90.3 | 87.0 |
| 36 hours | ¹(57.5) | 90.7 | 90.6 |

¹ Extrapolated.

The foregoing data demonstrate that the oxidation of crude Oxo formylation products is definitely inhibited by olefins. In their presence, the overall rate of conversion is low and the yields of acids are generally poor. Definite improvement in these respects is produced by olefin removal. Both vacuum and steam topping are shown to be effective, although in somewhat different degrees. The former affords a cleaner separation, but steam stripping with a small degree of fractionation is nearly as efficient for oxidation purposes as topping under a good vacuum, and hence is preferable from an operational point of view. These methods are most readily employed, however, on stocks below the C₉ range, because of difficulties in separation encountered with stocks of higher molecular weight and because of extensive aldehyde destruction during the topping of heavier materials.

*Example 2*

The yield of acid from a formylation product of n-butyleneisobutylene codimer was similarly improved by removal of olefins therefrom prior to oxidation. When the crude formylation product, containing 25.8 weight-percent nonyl aldehydes, was treated with oxygen at 70° C., nonanoic acids were formed to the extent of only 7.7 percent of theory at the end of 12 hours, and only 13.7 percent at the end of 24 hours. When the crude formylation product was steam distilled substantially free of codimer and oxidized at 80° C., by blowing with a moderate stream of oxygen for 19 hours, the yield of nonanoic acids was 55 percent of theoretical. When the crude formylation product was vacuum topped and oxidized on a pilot-plant scale by air blowing at 71° C. and 70 pounds per square inch gage, a conversion of 90 percent was reached at the end of 15 hours.

*Example 3*

A crude formylation product of n-butylene-isobutylene codimer was subjected to oxidation by air-blowing according to the following procedure, without a preliminary purification. The crude formylation product was diluted with hexane to an aldehyde content of 20 percent, anhydrous sodium carbonate (150 percent of theory) was added to form the salts of the nonanoic acids as they were formed, and the mixture was blown with air at around 70° C. until the oxidation had reached substantial completion. The neutral oil was separated from the reaction product, and the residual salts were treated with sulfuric acid to spring the organic acids. An 8 percent yield of nonanoic acids was obtained, based on the aldehydes present in the charging stock. Thus, it is apparent that the charging stock contained a powerful inhibitor for the oxidation reaction.

Another portion of the crude formylation product was subjected to steam distillation in the presence of an aqueous sodium acetate solution having a pH of 7.7. The distillation was discontinued when the vapor temperature at the top of the column reached 96° C. At this point, the codimer had been substantially completely withdrawn overhead, and was found to have carried along only 2 percent of the aldehydes, the rest of the aldehydes remaining in the distillation bottoms. A portion of the distillation bottoms was diluted with a C₈ alkylate to an aldehyde content of 16 percent, anhydrous sodium carbonate (150 percent of theory) was added, and the mixture was air-blown as described above. From the reaction product, nonanoic acids were recovered in an amount equivalent to a conversion of 80 percent, based on the aldehydes subjected to oxidation. Thus, it is apparent that the steam distillation was effective to remove oxidation inhibitors from the crude formylation product.

Another portion of the steam distillation bottoms referred to above was subjected to oxidation by the simple technique of air-blowing without added diluent, alkali, or oxidation catalyst. The aldehydes were oxidized thereby into nonanoic acids in a conversion of 88 percent.

*Example 4*

A crude formylation product of propylene tetramer, containing around 12 percent of tridecyl aldehydes, was steam distilled in the presence of an aqueous sodium bicarbonate solution. Approximately 18 percent of the tridecyl aldehydes were withdrawn overhead with the unreacted propylene tetramer, while 75 percent of the aldehydes remained in the steam distillation bottoms. Losses in handling and through side reactions accounted for the remaining 7 percent. When the bottoms fraction was blown with oxygen at 77° F. for 3 hours, a quantitative yield of tridecanoic acids was obtained.

*Example 5*

A crude formylation product of n-butylene-isobutylene codimer was steam distilled to remove the unreacted codimer and to obtain a purified aldehyde fraction as a distillation heart cut. The distillation was carried out in contact with an aqueous 10 percent sodium bicarbonate solution of neutral pH. The aldehyde heart cut was withdrawn at a top-of-column vapor temperature of 98 to 111° F. The heart cut was water-white, and analyzed 60 percent nonyl aldehydes and 14 percent nonyl alcohols. No loss of material was experienced, and 100 percent of the aldehydes were accounted for, while 90 percent of the alcohols originally present in the formylation product were recovered.

The aldehyde heart cut was blown with oxygen for 4 hours at 55° C., and was oxidized thereby to nonanoic acids in a conversion of 90 percent.

*Example 6*

Into a distillation vessel were introduced 390 grams of a crude formylation product of n-butylene-isobutylene codimer and 100 milliliters of aqueous 10 percent sodium bicarbonate. Free steam was then fed into the distillation vessel in a conventional manner, and the resulting vapors were fractionally distilled at a 1:1 reflux ratio through a column packed with glass helices. At the end of six hours, all of the unreacted codimer had been removed from the distillation vessel. The distillation was stopped at this point, and the residual sodium bicarbonate solution was withdrawn. The distillate and organic distillation bottoms, on being measured and analyzed, were found to contain respectively 45.5 grams and 80.6 grams of aldehydes, corresponding to 35 percent and 62 percent of the aldehydes in the distillation charge, and a total recovery of 97 percent.

Oxidation of the distillation bottoms gave a water-white acid mixture which analyzed 93 percent nonanoic acid.

*Example 7*

A crude n-butylene-isobutylene codimer formylation product (196 grams) analyzing 21 percent by weight nonyl aldehydes was mixed with aqueous 10 percent sodium bicarbonate solution (100 milliliters) and the mixture was steam-distilled over a period of five hours from a distillation vessel through a Stedman column at a reflux ratio of 1:1. The unreacted codimer and the mixed aldehydes were removed as successive distillate fractions, the later at a top-of-column temperature between 208 and 232° F. On analysis, the aldehyde content of the various fractions was found to be as follows:

|  | Weight, grams | Recovered, percent |
|---|---|---|
| Codimer distillate | 7.4 | 18 |
| Aldehyde distillate | 32.2 | 78 |
| Bottoms | 2.5 | 6 |

Oxidation of the aldehyde distillate fraction produced a water-white nonanoic acid mixture.

*Example 8*

Crude formylation product of n-butylene-isobutylene codimer (394 grams) containing 150 grams of nonyl aldehydes was steam distilled over a period of three hours in the presence of aqueous 0.5 N sodium acetate solution (250 ml.) having a pH of 7.7. The codimer was withdrawn overhead, leaving the aldehydes in the distillation bottoms. Analyses of distillate and bottoms showed a recovery of 151 grams of aldehydes. Upon oxidation of the bottoms, a water-white nonanoic acid mixture was produced, free from malodorous materials.

While I have described my invention with reference to certain specific embodiments thereof, it is to be understood that I am not limited thereto, but may employ any of the charging stocks, process materials, and manipulative procedures within the broad definitions set forth above, and I may use any of the apparatus, control means, and supplemental equipment commonly employed in the art. Other modifications and equivalents of my invention will be apparent from the foregoing description to those skilled in the art.

This application is a continuation-in-part of my application Serial No. 160,575, filed May 6, 1950, which issued as U. S. Patent 2,688,591 on September 7, 1954.

In accordance with the foregoing description, I claim as my invention:

1. A process for preparing a saturated aliphatic carboxylic acid from a $C_7$ propylene-butylene interpolymer formylation product obtained by means of the Oxo process and characterized by containing on a weight basis about 53 percent octyl aldehydes, 15 percent octyl alcohols, 7 percent high boiling materials and 25 percent unreacted olefins, which process comprises substantially eliminating olefins from said formylation product by distillation under vacuum and oxidizing the substantially olefin-free aldehydes by bubbling oxygen through a liquid mass thereof at a temperature of about 70° C. at an oxygen rate of about .12 mol per mol of aldehyde per hour for a period of at least 8 hours whereby acid yield during the 8 hour period is about seven times greater than obtainable from the same formylation product by oxidizing under the same conditions but in the absence of the olefin elimination step.

2. A process for preparing a saturated aliphatic carboxylic acid from an olefin formylation product obtained by means of the Oxo process, said formylation product containing an aldehyde and a substantial amount of an unreacted olefin, which process comprises substantially eliminating said unreacted olefin from said aldehyde and then contacting said substantially olefin-free aldehyde with oxygen at a temperature in the range of about 50 to 100° C. under a pressure of about 1 to 10 atmospheres absolute for a time period in the range of about 2 to 24 hours whereby the acid yield in a given time is much greater than would be obtained by oxidizing the formylation product under similar conditions in the absence of the olefin elimination step.

3. The method of claim 2 wherein the contacting of the olefin-free aldehyde with oxygen is effected by contacting the aldehyde in liquid phase with air.

References Cited in the file of this patent

UNITED STATES PATENTS

| 2,456,549 | Weizmann | Dec. 14, 1948 |
| 2,514,961 | Max | July 11, 1950 |
| 2,688,591 | Hill | Sept. 7, 1954 |

OTHER REFERENCES

"Oxo Process," edited and distributed by Charles A. Meyer and Co., New York City (1948), page 3.